United States Patent [19]

Takamizawa et al.

[11] 4,384,100
[45] May 17, 1983

[54] NOVEL DIORGANOPOLYSILOXANE COMPOUNDS

[75] Inventors: Minoru Takamizawa, Annaka; Shigeo Kimura, Miyagi; Masashi Somezawa, Miyagi; Kunio Kobayashi, Miyagi; Yoshio Inoue; Hiroshi Yoshioka, both of Annaka, all of Japan

[73] Assignees: Shin-Etsu Chemical Co., Ltd.; Sony Corporation, both of Tokyo, Japan

[21] Appl. No.: 267,542

[22] Filed: May 27, 1981

[30] Foreign Application Priority Data

May 28, 1980 [JP] Japan .................................. 55-71032

[51] Int. Cl.$^3$ .................................................. C08G 77/00
[52] U.S. Cl. .................................... 528/41; 525/474; 525/479; 528/15; 528/26; 528/31; 528/42; 556/437; 556/438; 556/439; 556/440; 556/462; 556/485

[58] Field of Search ............... 556/437, 438, 439, 440, 556/462, 485; 528/42, 41, 15, 26, 31; 525/474, 479

[56] References Cited

U.S. PATENT DOCUMENTS 3,112,333  11/1963  Bailey ........................... 556/439
3,427,271  2/1969   McKellar ....................... 556/437

Primary Examiner—Melvyn I. Marquis
Attorney, Agent, or Firm—Toren, McGeady and Stanger

[57] ABSTRACT

The invention provides a novel diorganopolysiloxane compound composed of dimethysiloxane units, methyl (2-perfluoroalkylethyl)siloxane units and methyl acyloxyalkylsiloxane units. The novel diorganopolysiloxane compounds of the invention have excellent lubricating properties so that they are useful as an additive ingredient in various materials such as coating compositions, magnetic layer of recording tapes and the like where lubricity or mold releasability is essential.

1 Claim, 5 Drawing Figures

NOVEL DIORGANOPOLYSILOXANE COMPOUNDS

BACKGROUND OF THE INVENTION

The present invention relates to a novel diorganopolysiloxane compound hitherto not known or not described in any prior art literatures. More particularly, the invention relates to a novel diorganopolysiloxane compound having excellent lubricating properties and useful as an additive in a coating composition, in a magnetic layer of recording tapes and in a synthetic resin composition for molding.

SUMMARY OF THE INVENTION

The novel diorganopolysiloxane compounds disclosed in the present invention are composed of three kinds of diorganosiloxane units. They are: dimethylsiloxane units expressed by the formula —SiMe$_2$—O—, in which, and hereinafter, Me denotes a methyl group, methyl (2-perfluoroalkylethyl)siloxane units expressed by the formula —SiMeQ—O—, in which Q is a 2-perfluoroalkylethyl group expressed by the formula F—(CF$_2$)$_p$CH$_2$—CH$_2$—, p being an integer from 1 to 13 inclusive, and methyl acyloxyalkylsiloxane units expressed by the formula —SiMeG—O—, in which G is an acyloxyalkyl group expressed by the formula R$^1$—CO—O—R$^2$—, R$^1$ and R$^2$ being each a saturated or unsaturated monovalent hydrocarbon group having from 7 to 21 carbon atoms and a saturated divalent hydrocarbon group having from 1 to 5 carbon atoms, respectively.

Accordingly, the diorganopolysiloxane compound of the invention is represented by the general formula in which A is a terminal group which may be a methyl group, a group Q or a group G, and the siffixes l, m and n are each zero or a positive integer not exceeding 100 with the proviso that m and n cannot be zero when the terminal group A is not the group Q or the group G, respectively.

The diorganopolysiloxane compound of the above formula (I) can be prepared by several methods and, most conveniently, obtained, for example, by the so-called hydrosilation reaction between an organohydrogenpolysiloxane represented by the general formula in which the terminal group A' is a hydrogen atom, a Me group or a group Q, and an alkenyl ester of a carboxylic acid represented by the general formula R$^1$—CO—O—R$^3$, in which R$^1$ has the same meaning as defined above and R$^3$ is an alkenyl group having not more than five carbon atoms, in the presence of a platinum catalyst.

DETAILED DESCRIPTION OF THE PREFERRED EMBODIMENTS

As is described above, the inventive diorganopolysiloxane is composed of three kinds of diorganosiloxane units as represented by the general formula (I) above. The first class of the diorganosiloxane units is the dimethylsiloxane units —SiMe$_2$—O— which is conventional and need not be described in detail. The second class of the diorganosiloxane units is the methyl 2-perfluoroalkyethyl siloxane unit of the formula —SiMeQ—O—, in which the group Q is a 2-perfluoroalkylethyl group F—(CF$_2$)$_p$CH$_2$CH$_2$—, p being an integer from 1 to 13 or, preferably, from 1 to 8 so that the 2-perfluoroalkylethyl group is exemplified by CF$_3$CH$_2$CH$_2$—, CF$_3$CF$_2$CH$_2$CH$_2$—, F—(CF$_2$)$_4$CH$_2$CH$_2$—, F—(CF$_2$)$_8$CH$_2$CH$_2$— and the like.

Further, the third class of the diorganosiloxane units is the methyl acyloxyalkysiloxane unit of the formula —SiMeG—O— in which the group G is the acyloxyalkyl group R$^1$CO—O—R$^2$—, R$^1$ and R$^2$ each having the same meaning as defined above. Several of the examples of the acyloxyalkyl group are: C$_{13}$H$_{27}$COOCH$_2$—, C$_{17}$H$_{33}$COOCH$_2$—, C$_9$H$_{19}$COOCH$_2$CH$_2$CH$_2$—, C$_{13}$H$_{27}$COOCH$_2$CH$_2$CH$_2$—, C$_{17}$H$_{33}$COOCH$_2$CH$_2$CH$_2$—, C$_{17}$H$_{35}$COOCH$_2$CH$_2$CH$_2$—, C$_{21}$H$_{43}$COOCH$_2$CH$_2$CH$_2$—, C$_{13}$H$_{27}$COOCH(CH$_3$)CH$_2$CH$_2$—, C$_7$H$_{15}$COOCH(CH$_3$)CH$_2$CH$_2$— and the like. As is understood from the above exemplification, the group R$^1$ may be an alkyl group or an alkenyl group.

The suffixes l, m and n in the general formula (I) each give the average number of the respective diorganosiloxane units in the molecule of the inventive diorganopolysiloxane and are each zero or a positive integer not exceeding 100. However, m and n for the second and third classes of the siloxane units each cannot be zero when the terminal group denoted by the symbol A in the general formula (I) is not the group Q or the group G, respectively. In other words, the inventive diorganopolysiloxane must have at least one of each of the groups Q and G no matter where the position of the silicon atom may be to which the group Q or G is bonded.

Several of the examples of the inventive diorganopolysiloxane in conformity with the above requirements are shown by the following structural formulas:

The above described inventive diorganopolysiloxanes may be prepared by several methods. One of the most convenient methods for the preparation is, as is mentioned before, the hydrosilation between an organohydrogenpolysiloxane preprensented by the general formula (II) and an alkenyl ester of a carboxylic acid $R^1COOH$ represented by the general formula $R^1COOR^3$, in which $R^1$ and $R^3$ each have the same meaning as defined before. Several examples of such ester compounds are: $C_9H_{19}COOCH=CH_2$; $C_{13}H_{27}COOCH_2CH=CH_2$; $C_{17}H_{33}COOCH_2CH=CH_2$; $C_{17}H_{35}COOCH_2CH=CH_2$; $C_{21}H_{43}COOCH_2CH=CH_2$; $C_7H_{15}COOCH(CH_3)CH=CH_2$ and $C_{13}H_{27}COOCH(CH_3)CH=CH_2$ The hydrosilation reaction, i.e. the addition reaction, between the organohydrogenpolysiloxane and the ester compound can be performed by blending and heating them together at a temperature from 60° to 150° C. in the presence of a platinum compound as a catalyst. It is of course optional that the above reactants are diluted with a suitable organic solvent inert to the reaction conditions such as aromatic hydrocarbon solvents, e.g. benzene, toluene, xylene and the like, aliphatic hydrocarbon solvents, e.g. n-hexane, n-octane and the like, halogenated hydrocarbon solvents, e.g. trichloroethane, tetrachloroethylene and the like and ether solvents, e.g. dipropyl ether, dibutyl ether and the like. The progress of the addition reaction can readily be followed by means of an infrared absorption spectral analysis to indicate the disappearance of the unsaturated linkages in the ester compound or of the silicon-bonded hydrogen atoms in the organohydrogenpolysiloxane.

An alternative method for the preparation of the inventive diorganopolysiloxane uses, as the starting polysiloxane compound, a halogenoalkyl-substituted diorganopolysiloxane represented by the general formula in which $R^2$, Q, l, m and n each have the same meaning as defined above and the terminal group denoted by A" is a methyl group, group Q or a group $-R^2-X$, X being a chlorine atom or a bromine atom. The above defined halogenoalkyl-containing diorganopoly siloxane is reacted with a carboxylic acid $R^1COOH$, where $R^1$ has the same meaning as defined above, or an alkali metal salt of the above carboxylic acid in the presence of an acid acceptor such as triethylamine, pyridine and the like to effect the condensation reaction between the reactants with formation of a hydrogen halide or an alkali metal halide as the condensation product. The above described condensation reaction is performed at a temperature from 80° to 200° C., if necessary, under a pressurized condition. Suitable organic solvents may be used according to need. The progress of the condensation reaction can be visually observed by the formation of the precipitating salt such as the triethylamine hydrochloride or sodium chloride in the reaction mixture. More accurately, the infrared absoprtion spectral analysis can also be a reliable method for tracing the progress of the condensation reaction by determining the content of the carbonyl groups in the reaction product. The chemical analysis of the halogen in the reaction product may be undertaken in parallel.

Several of the examples of the carboxylic acid or alkali metal salt thereof suitable for the reaction are as follows: $C_7H_{15}COOH$, $C_9H_{19}COOH$, $C_{13}H_{27}COOH$, $C_{15}H_{31}COOH$, $C_{17}H_{33}COOH$, $C_{17}H_{35}COOH$, $C_{21}H_{43}COOH$, $C_7H_{15}COONa$, $C_9H_{19}COONa$, $C_{13}H_{27}COOK$, $C_{15}H_{31}COOK$, $C_{17}H_{33}COONa$, $C_{17}H_{35}COONa$ and $C_{21}H_{43}COONa$.

The diorganopolysiloxane compounds of the present invention have excellent lubricating properties and mold releasability so that they find applications in a variety of fields where such properties are essential. They are used, for example, as a lubricant for metals and plastics, as an additive ingredient in coating compositions to impart lubricity or anti-blocking performance to the coated surface, as a lubricating agent in the magnetic recording tapes and an additive ingredient in various plastics and rubber compositions to improve the moldability and releasability from the metal mold in shaping and the surface properties of the shaped articles of them.

Following are the examples of the preparation of the inventive diorganopolysiloxanes either by the hydrosilation or by the condensation reaction. In each of the preparations 1 to 10 given below, the identification of the chemical structure of the product diorganopolysiloxane was made as supported by the results of the elementary analysis for silicon, carbon and fluorine and the NMR spectral analysis for the content of the methyl groups bonded to the silicon atoms as well as by the combination of the starting reactants necessarily leading to the desired product. Table 1 given below summarizes the results of the elementary analysis and the NMR spectral analysis as compared with the calculated values as well as the specific gravity, viscosity and refractive index each at 25° C. of each of the product diorganopolysiloxanes as the representative physical parameters of the compound.

PREPARATION 1

Into a four-necked flask equipped with a reflux condenser, a thermometer, a stirrer and a dropping funnel were introduced 212 g of an allyl caprate $C_9H_{19}COOCH_2CH=CH_2$, 0.26 g of a solution of chloroplatinic acid in 2-ethylhexyl alcohol in a concentration of 2% by weight as platinum (hereinafter simply called the platinum solution) and 200 g of toluene to form a reaction mixture, into which 201 g of an organohydrogenpolysiloxane expressed by the structural formula below were added dropwise while keeping the reaction mixture at 80° C. Increase in the temperature was noted immediately after beginning of the dropwise addition of the siloxane indicating the desired reaction taking place. The temperature had reached 106° C. when the dropwise addition of the siloxane was completed.

After the end of the dropwise addition of the siloxane, the reaction mixture was kept at 110° C. for 5 hours to complete the reaction and then toluene as the solvent was removed by distilling off under reduced pressure to give 408 g of a clear and light yellow liquid product which had assumedly the structure shown by the structural formula given below.

Figure 1:
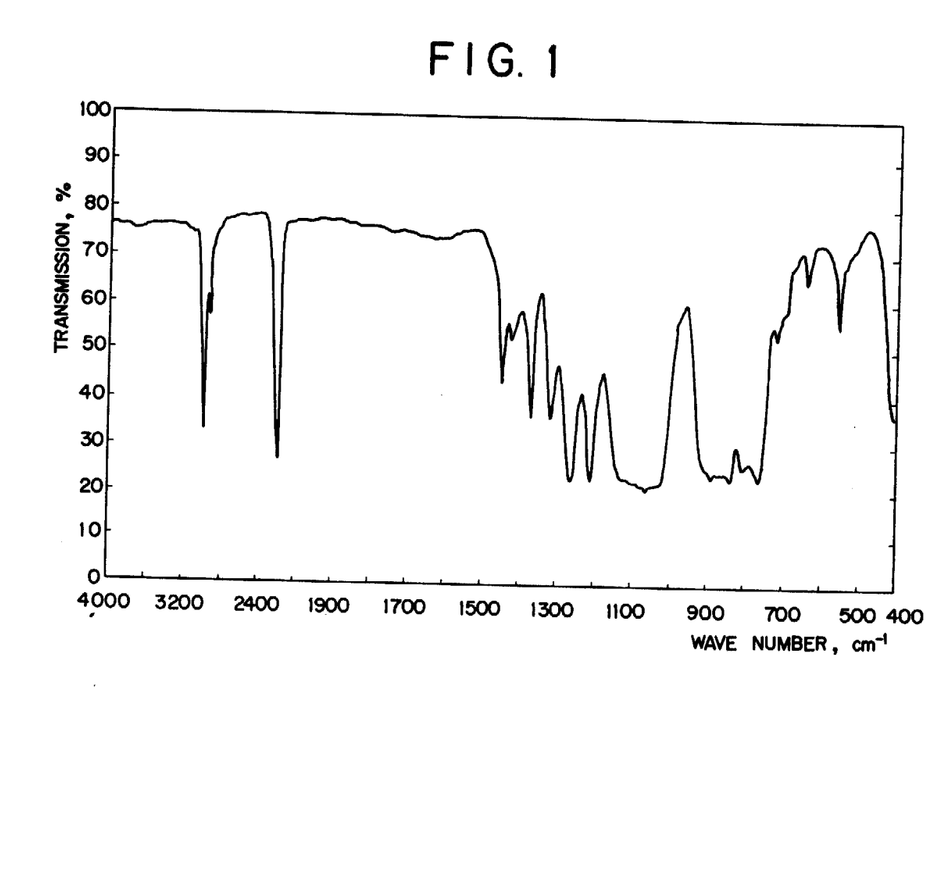
FIGS. 1 and 2 are each the infrared absorption spectrum of one of the starting materials used in the preparation described in Example 1.
Figure 2:
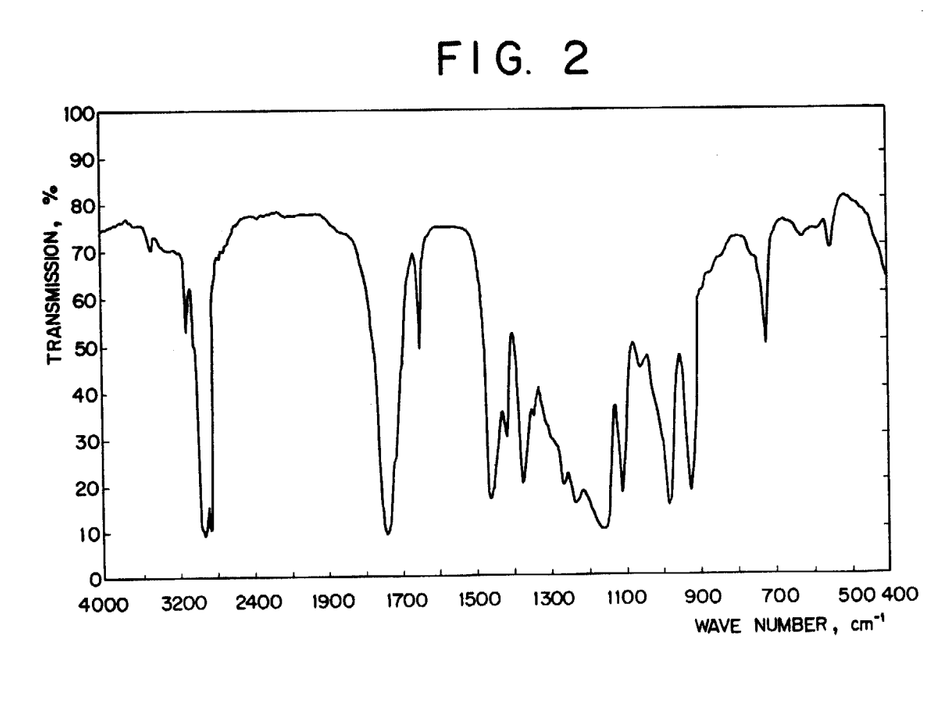
Figure 3:
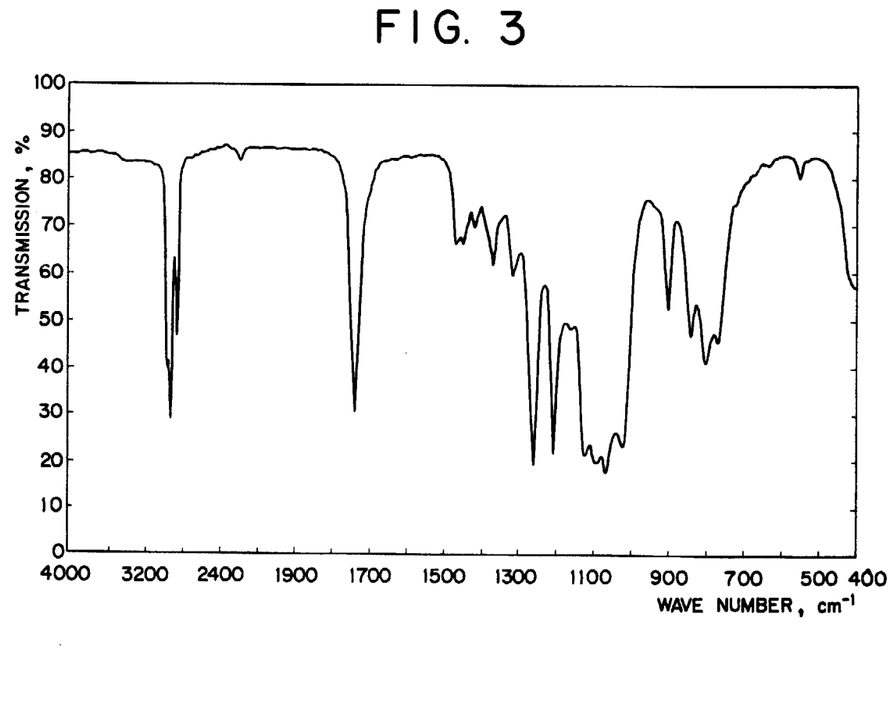
FIGS. 3 to 5 are each the infrared absorption spectrum of the invention diorganopolysiloxane compound obtained in Example 1, 2 or 4, respectively.

FIGS. 1 to 3 each illustrate the infrared absorption spectrum of the organohydrogenpolysiloxane or allyl caprate as the starting materials or the reaction product, respectively. It was noted that the absorption bands at 2160 cm$^{-1}$ and 1648 cm$^{-1}$ assigned to —Si—H and CH$_2$=CH— in FIGS. 1 and 2, respectively, disappeared in FIG. 3 indicating the addition reaction between these functional groups.

Starting organohydrogenpolysiloxane:

Product diorganopolysiloxane:

PREPARATION 2

The experimental procedure was about the same as in the preceding Preparation 1 except that the reaction mixture was formed by blending 137.2 g of allyl stearate $C_{17}H_{35}COOCH_2CH=CH_2$, 0.08 g of platinum solution and 100 g of toluene and 64.8 g of an organohydrogenpolysiloxane expressed by the following structural formula were added dropwise thereinto while keeping the mixture at 110° C. although the temperature of the reaction mixture was gradually increased by the heat of reaction as the siloxane was added reaching 123° C. at the end of the dropwise addition of the siloxane. The reaction was completed by heating for 7 hours at the refluxing temperature of toluene followed by the removal of toluene by distilling away under reduced pressure to give 187.5 g of a reaction product which was a milky white solid at room temperature melting at 55° C. The chemical structure of this product was as given by the structural formula below.

Figure 4:
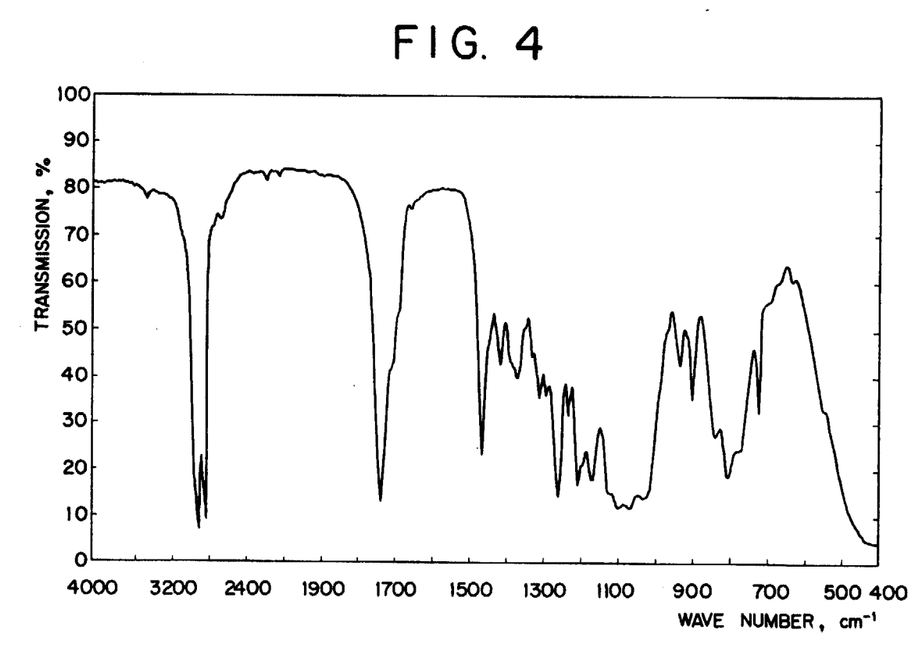
Figure 5:
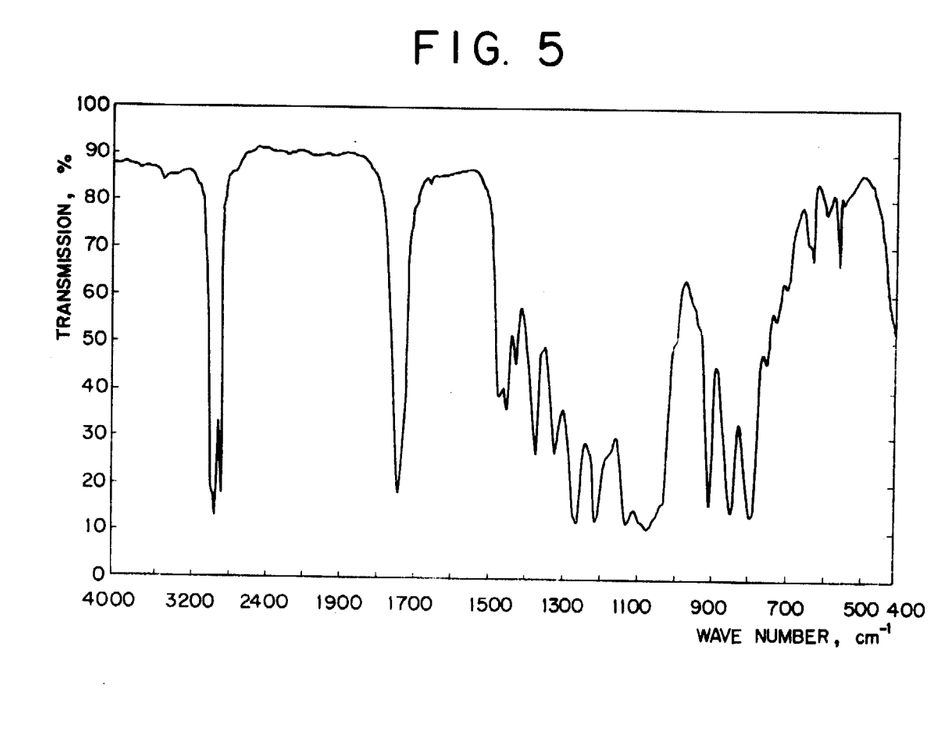

Starting organohydrogenpolysiloxane:

Product diorganopolysiloxane:

The infrared absorption spectrum of this reaction product is shown in FIG. 4.

PREPARATION 3

Into the same flask as used in Preparation 2 were introduced 79.0 g of a chloroalkyl-containing diorganopolysiloxane having a structure expressed by the formula below, 34.9 g of sodium caprate and 150 g of N,N-dimethylformamide and the reaction mixture was heated for 8 hours at the refluxing temperature of N,N-dimethylformamide to effect the condensation reaction. Then, the precipitated sodium chloride was removed from the reaction mixture by filtration and the solvent and other volatile matter were distilled away to leave 87.8 g of a clear and light yellow liquid product. The structure of this reaction product was as shown by the following structural formula.

Starting chloroalkyl-containing organopolysiloxane:

Product diorganopolysiloxane:

PREPARATION 4

Into the same flask as used in Preparation 1 were introduced 141 g of 1-methylallyl myristate $C_{13}H_{27}COOCH(CH_3)CH=CH_2$, 0.13 g of the platinum solution and 150 g of toluene and 193 g of an organohydrogenpolysiloxane expressed by the structural formula below were added dropwise into the reaction mixture heated at 90° C. Evolution of heat of reaction was observed as the polysiloxane was added and the temperature of the reaction mixture had reached 104° C. at the end of the dropwise addition of the polysiloxane.

The reaction was completed by heating the reaction mixture for 5 hours at the refluxing temperature of toluene after the end of the dropwise addition of the polysiloxane followed by the removal of toluene under reduced pressure to give 324 g of a clear and light yellow liquid. The structure of this reaction product was as expressed by the following structural formula.

Starting organohydrogenpolysiloxane:

Product organopolysiloxane:

PREPARATION 5

Into the same flask as used in Preparation 1 were introduced 212 g of an allyl caprate $C_9H_{19}COOCH_2CH=CH_2$, 0.24 g of the platinum solution and 227 g of toluene and then 167.5 g of an organohydrogenpolysiloxane expressed by the structural formula shown below were added dropwise into the reaction mixture heated in advance at 80° C. Subsequent treatment of the reaction mixture in about the same manner as in Preparation 1 gave 349.5 g of a liquid product which was a diorganopolysiloxane expressed by the structural formula shown below.

Starting organohydrogenpolysiloxane:

Product diorganopolysiloxane:

PREPARATION 6

Into the same flask as used in Preparation 1 were introduced 268 g of allyl myristate $C_{13}H_{27}COOCH_2CH=CH_2$, 0.27 g of the platinum solution and 263 g of toluene and then 167.5 g of an organohydrogenpolysiloxane expressed by the structural formula shown below were added dropwise into the reaction mixture heated in advance at 80° C. Subsequent treatment in about the same manner as in Preparation 1 gave 412.4 g of a liquid product which was a diorganopolysiloxane expressed by the structural formula shown below.

Starting organohydrogenpolysiloxane:

Product diorganopolysiloxane:

PREPARATION 7

Into the same flask as used in Preparation 1 were introduced 162 g of allyl stearate $C_{17}H_{35}COOCH_2CH=CH_2$, 0.17 g of the platinum solution and 158 g of toluene and then 105 g of an organohydrogenpolysiloxane expressed by the structural formula shown below were added dropwise into the reaction mixture heated in advance at 80° C. Subsequent treatment of the reaction mixture in about the same manner as in Preparation 1 gave 245.0 g of a product which was solid at room temperature melting at 34° C. and expressed by the structural formula shown below.

Starting organohydrogenpolysiloxane:

Product diorganopolysiloxane:

PREPARATION 8

Into the same flask as used in Preparation 1 were introduced 132.9 g of a chloropropyl-containing starting organopolysiloxane expressed by the structural formula shown below, 66.7 g of triethylamine and 37 g of toluene and then 136.8 g of myristic acid were added dropwise into the reaction mixture heated in advance at 80° C. The dehydrochlorination reaction was carried out by heating the reaction mixture for 7 hours at the refluxing temperature of toluene after the end of the dropwise addition of myristic acid.

The precipitated triethylamine hydrochloride was removed by filtration from the reaction mixture cooled to room temperature. Subsequent removal of toluene and other volatile matter by distillation under reduced pressure gave 226.7 g of a liquid product which was a diorganopolysiloxane expressed by the structural formula shown below.

Starting organopolysiloxane:

Product organopolysiloxane:

$$C_{13}H_{27}COOCH_2CH_2CH_2-Si(Me)(Me)-O-Si(Me)(CH_2CH_2CF_3)-O-Si(Me)(Me)-CH_2CH_2CH_2OCOC_{13}H_{27}$$

PREPARATION 9

Into the same flask as used in Preparation 8 were introduced 197.6 g of a chloromethyl-containing diorganopolysiloxane expressed by the structural formula shown below and 200 g of N,N-dimethylformamide and then 4.3 g of sodium behenate $C_{21}H_{43}COONa$ were added to the reaction mixture heated in advance to 80° C. and the reaction mixture was heated for 7 hours at the refluxing temperature of N,N-dimethylformamide. Removal of the precipitated sodium chloride and the solvent from the reaction mixture gave 182.7 g of a product which was solid at room temperature melting at 41° C. and expressed by the structural formula shown below.

Starting diorganopolysiloxane:

Product diorganopolysiloxane:

PREPARATION 10

Into the same flask as used in Preparation 8 were introduced 166.8 g of a chloropropyl-containing diorganopolysiloxane expressed by the structural formula shown below, 81.5 g of triethylamine and 467 g of toluene and then 206.8 g of oleic acid $C_{17}H_{33}COOH$ were added to the reaction mixture heated in advance to 80° C. to effect the dehydrochlorination reaction by heating the mixture for 8 hours at the refluxing temperature of toluene. Removal of the precipitated triethylamine hydrochloride and toluene from the reaction mixture gave 319.8 g of a liquid product which was a diorganopolysiloxane expressed by the structural formula shown below.

Starting diorganopolysiloxane:

Product diorganopolysiloxane:

TABLE 1

Analytical Results and Physical Properties of the Products

| Preparation No. | Elementary analysis (calculated/found) | | | N.M.R. analysis for —Si—Me, moles/100 g | Physical properties at 25° C. | | |
|---|---|---|---|---|---|---|---|
| | Si, % | C, % | F, % | | Specific gravity | Viscosity, centistokes | Refractive index |
| 1 | 13.6/13.4 | 51.7/52.0 | 11.0/11.1 | 0.58/0.57 | 1.048 | 133 | 1.4254 |
| 2 | 8.52/8.50 | 64.8/64.9 | 4.33/4.34 | 0.38/0.38 | — | — | — |
| 3 | 16.3/16.1 | 45.0/45.1 | 16.5/16.5 | 0.91/0.92 | 1.114 | 351.8 | 1.4100 |
| 4 | 12.6/12.5 | 52.1/52.1 | 17.1/17.1 | 0.75/0.75 | 1.007 | 12.2 | 1.4158 |
| 5 | 14.8/14.6 | 53.4/53.6 | 6.01/6.00 | 0.71/0.71 | 1.015 | 297.9 | 1.4334 |
| 6 | 12.9/13.0 | 57.6/57.5 | 5.24/5.22 | 0.62/0.63 | 0.986 | 342.5 | 1.4395 |
| 7 | 10.7/10.7 | 59.0/58.8 | 8.69/8.75 | 0.46/0.46 | — | — | — |
| 8 | 10.2/10.2 | 61.0/61.9 | 6.90/7.00 | 0.61/0.61 | 1.005 | 22.6 | 1.4257 |
| 9 | 33.1/33.0 | 35.8/35.9 | 3.7/3.72 | 0.76/0.75 | — | — | — |
| 10 | 10.8/10.7 | 62.0/62.4 | 4.38/4.32 | — | 0.969 | 331.5 | 1.4547 |

What is claimed is:

1. A diorganopolysiloxane compound having the formula in which Me is a methyl group, Q is a 2-perfluoroalkylethyl group expressed by the formula $F-(CF_2)_pCH_2-CH_2-$, p being an integer from 1 to 13 inclusive, G is an acyloxyalkyl group expressed by the formula $R^1-CO-O-R^2-$, $R^1$ and $R^2$ being a saturated or unsaturated monovalent hydrocarbon group having from 7 to 21 carbon atoms and a saturated divalent hydrocarbon group having from 1 to 5 carbon atoms, respectively, A is a group of Me, Q or G, and the suffixes l, m and n are each a positive integer up to and not exceeding 100.

* * * * *